United States Patent [19]

Blyler, Jr. et al.

[11] Patent Number: 5,311,608
[45] Date of Patent: May 10, 1994

[54] MOLDING OF OPTICAL COMPONENTS USING OPTICAL FIBERS TO FORM A MOLD

[75] Inventors: Lee L. Blyler, Jr., Basking Ridge, N.J.; Gary J. Grimes, Thornton, Colo.

[73] Assignee: AT&T Bell Laboratories, Murray Hill, N.J.

[21] Appl. No.: 110,170

[22] Filed: Aug. 20, 1993

Related U.S. Application Data

[62] Division of Ser. No. 922,893, Jul. 31, 1992, Pat. No. 5,308,555.

[51] Int. Cl.⁵ .............................. G02B 6/26
[52] U.S. Cl. ........................ 385/50; 385/39; 385/46
[58] Field of Search ............ 385/50, 39, 46, 51, 385/45

[56] References Cited

U.S. PATENT DOCUMENTS

| | | | |
|---|---|---|---|
| 5,019,301 | 4/1991 | Coden et al. | 385/46 |
| 5,030,321 | 7/1991 | Contandin et al. | 385/45 |
| 5,255,336 | 10/1993 | Kuder et al. | 385/46 |

Primary Examiner—Rodney B. Bovernick
Assistant Examiner—Stephen W. Barns
Attorney, Agent, or Firm—John C. Moran

[57] ABSTRACT

Molding optical components from a mold that is produced using the same type of optical fibers that will be interconnected by the optical components. The outer diameter of a silica optical fiber varies only by approximately ±1 micron and the outer surface of a silica optical fiber has an optical finish. Thus by using optical fiber to fabricate molds, molds can be produced which have the required accuracy and finish for the production of optical components. The outer coating of the optical fibers used to fabricate the mold is only removed within and in close proximity to a combination region in a splitter/combiner resulting in the capability to pigtail optical fibers attached to a splitter/combiner molded from the resulting mold.

10 Claims, 6 Drawing Sheets

CROSS-SECTION 106

CROSS-SECTION 109

CROSS-SECTION 401

CROSS-SECTION 402

FIG. 7 SPLITTER/COMBINER 700
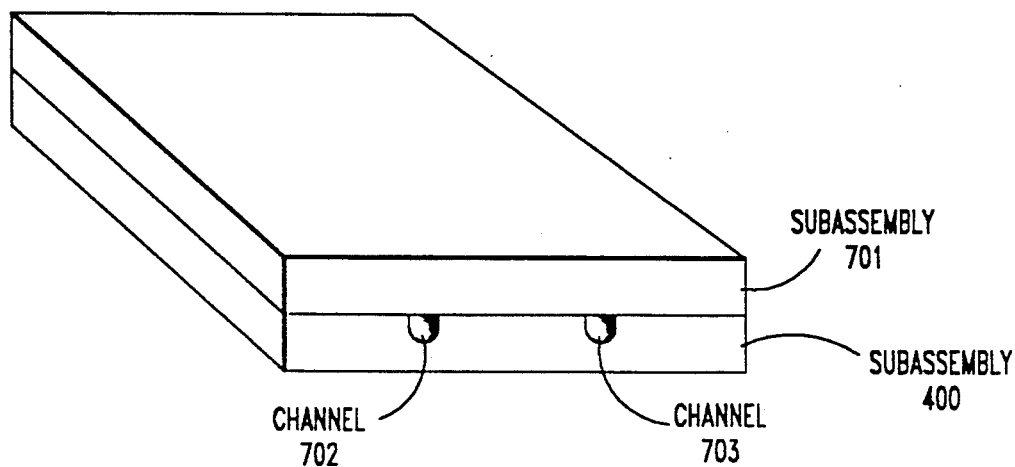
FIG. 8
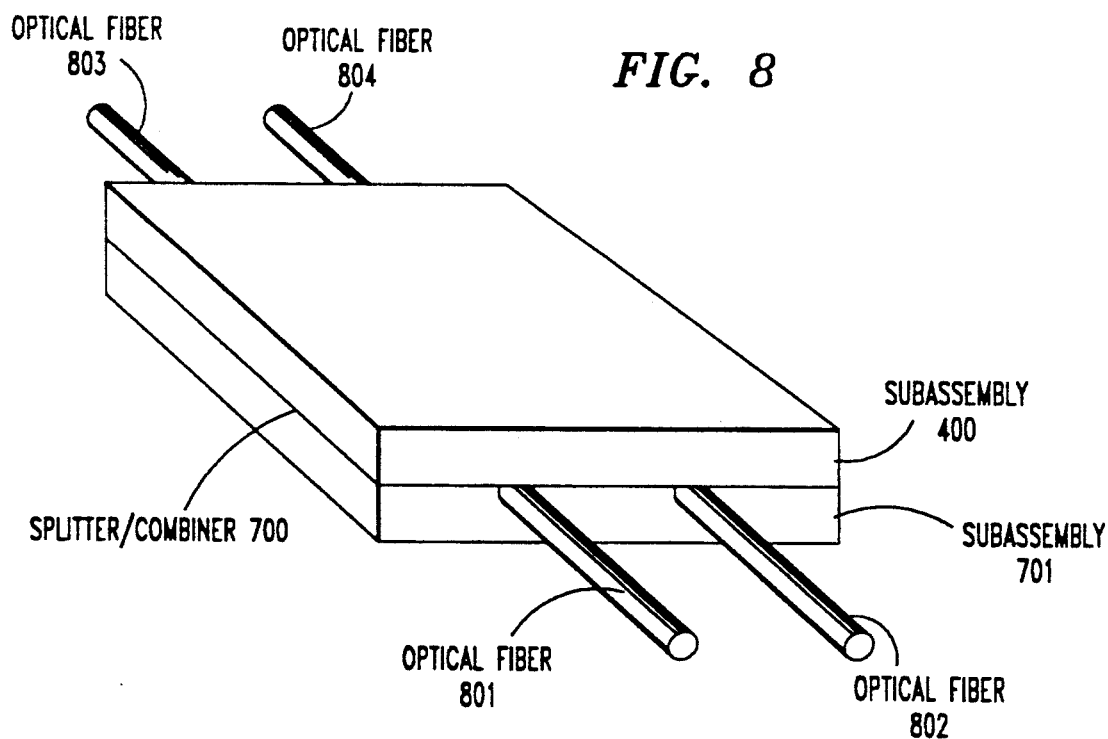

FIG. 9  SPLITTER/COMBINER 900
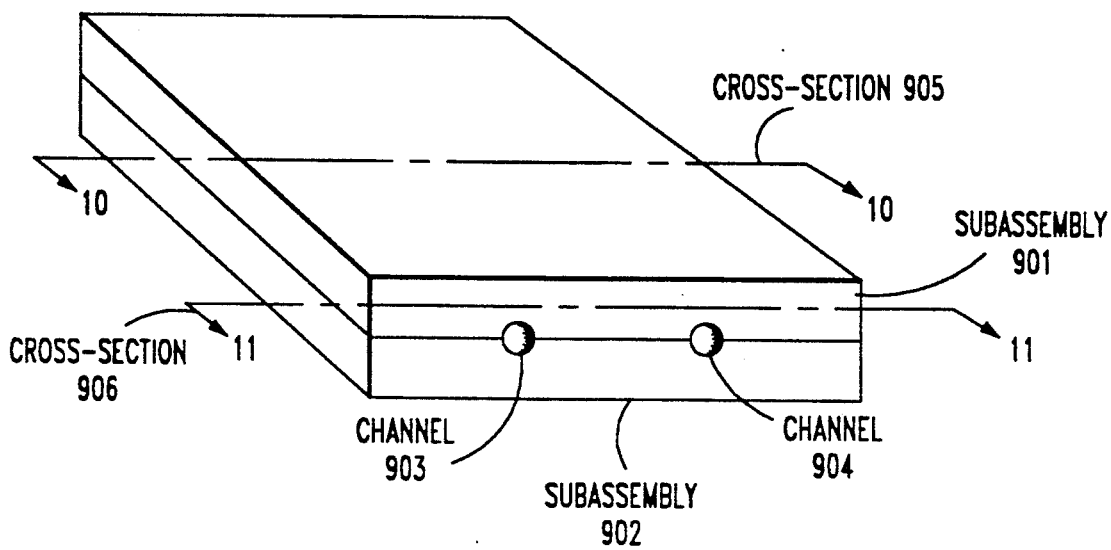
FIG. 10
CROSS-SECTION 905
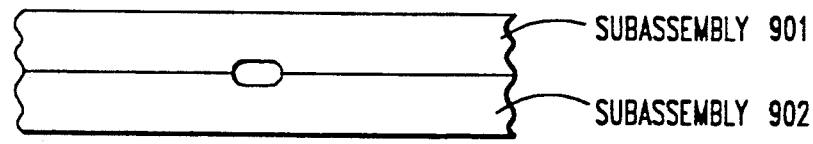
FIG. 11
CROSS-SECTION 906
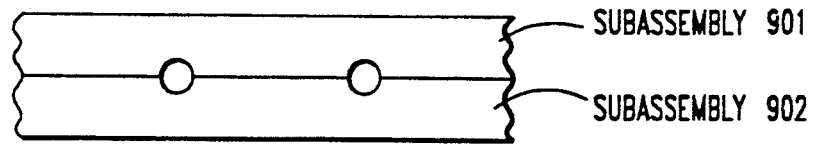

CROSS-SECTION 1201

CROSS-SECTION 1202

CROSS-SECTION 1506

CROSS-SECTION 1507

CROSS-SECTION 1508

MOLDING OF OPTICAL COMPONENTS USING OPTICAL FIBERS TO FORM A MOLD

This is a division of application Ser. No. 07/922,893 filed Jul. 31, 1992, now U.S. Pat. No. 5,308,555.

TECHNICAL FIELD

This invention relates to fabrication of optical components such as optical splitter/combiner and more particularly, to the construction of molds for such components.

BACKGROUND OF THE INVENTION

Molding is an extremely powerful process because of the ability to transfer small details and surface finish from a mold to molded parts. U.S. Pat. No. 5,166,993, discloses molded optical components. However, techniques used in this patent application are limited to producing optical components that interconnect relatively large optical fibers having very thin optical cladding in comparison to the diameter of the optical core.

Molding has not been used to produce optical components for interconnecting optical fibers when the cladding and core have a small overall diameter such as 125 microns. For interconnecting these smaller optical fibers, a fusing technique has been used to physically fuse the optical fibers using heat and tension. Also etching and ablation techniques have been used to individually produce each optical component. Both of these techniques suffer from high costs. Further, these two techniques do not provide a direct mechanism for physically securing the optical fibers to the optical component which is often called pigtailing.

SUMMARY OF THE INVENTION

The aforementioned problems are solved and a technical advance is achieved in the art by molding optical components from a mold that is produced using the same type of optical fibers that will be interconnected by the optical components. The invention makes use of the following facts; the outer diameter of a silica optical fiber varies only by approximately ±1 micron and the outer surface of a silica optical fiber has an optical finish. Thus by using optical fiber to fabricate molds, molds can be produced which have the required accuracy and finish. In one illustrious embodiment, a one piece mold for molding an optical splitter/combiner is fabricated by securing two optical fibers on an optically polished flat surface having surrounding walls. The optical fibers are arranged so that the optical fibers are contacting each other to form a splitter/combiner region. The outer coating of the optical fibers is only removed within close proximity to the splitter/combiner region resulting in the capability to pigtail optical fibers attached to a splitter/combiner molded from the resulting mold.

In a second illustrious embodiment, a two piece mold of an optical splitter/combiner is fabricated by producing each piece as follows. Two types of optical fibers are used to fabricate the mold. The diameter of the first type including outer coating, cladding and core is equal to the diameter of the optical fibers to be interconnected to the resulting splitter/combiner. The diameter of the second type of optical fiber including cladding and core is equal to the diameter of the core of the first type of optical fiber. Three sets of grooves are etched into a substrate. The first set of grooves has a depth equal to the radius and a width equal to the diameter of the first type of optical fibers, the second set of grooves has a depth equal to the radius and width equal to the diameter of second type of optical fibers, the third set of grooves has only one groove which has a depth equal to the radius of the second type of optical fibers and a width equal to the diameter of the second type of optical fibers multipled by the number of input optical fibers that will be interconnected to the optical splitter/combiner. The grooves are arranged such that the second set of grooves are abutted to the first and third sets of grooves. The first type of optical fibers are attached into the first set of grooves, and the second type of optical fibers are attached into the second and third sets of grooves such that the first set of optical fibers are abutted to the second set of optical fibers. The mold is then formed by enclosing the substrate with walls.

BRIEF DESCRIPTION OF THE DRAWING

FIG. 7 illustrates, in a pictorial manner, a splitter/combiner which incorporates the subassembly of FIG. 4;

FIG. 8 illustrates the splitter/combiner of FIG. 7 with attached optical fibers;

FIG. 9 illustrates a splitter/combiner fabricated by the another embodiment of the invention;

FIGS. 10 and 11 illustrate cross-sectional views of the splitter/combiner of FIG. 9;

DETAILED DESCRIPTION

Figure 1:
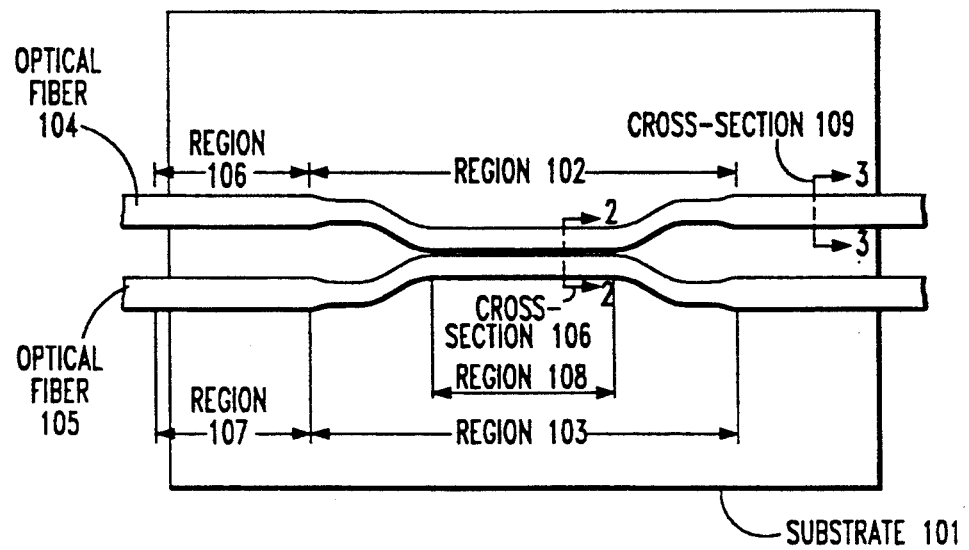
FIG. 1 illustrates a first apparatus for casting a mold for a two input optical splitter/combiner.

FIG. 1 illustrates a top view of a one piece mold for a two input and two output optical splitter/combiner. Optical fibers 104 and 105 are attached by means of an adhesive such as an epoxy onto substrate 101 which is flat to within a predetermined tolerance but does not need an optical finish. Before being attached onto substrate 101, the coating of optical fibers 104 and 105 in regions 102 and 103 is removed by chemical etching. The splitting/combining portion of the optical splitter/combiner will be within the region 108 where optical fibers 104 and 105 are in contact with each other. Cross-section 106 as illustrated in FIG. 2 illustrates region 108 of FIG. 1.

Figure 2:
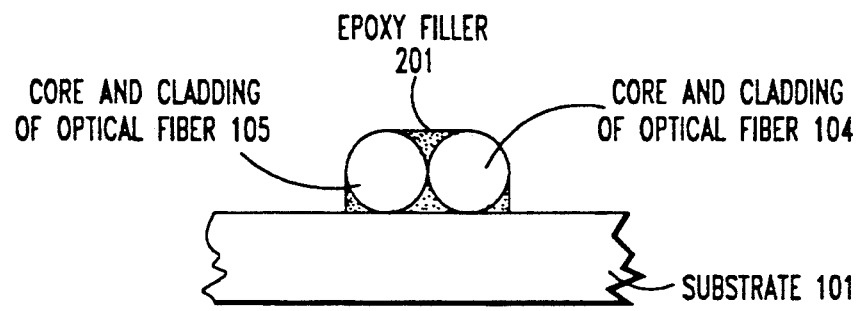
FIGS. 2 and 3 illustrate cross-sectional views of portions of FIG. 1.

FIG. 2 illustrates that epoxy filler 201 is utilized to fill in the region between optical fibers 104 and 105 and also the regions between optical fibers 104 and 105 and substrate 101. After epoxy filler 201 has been placed in the regions as indicated in FIG. 2, it is then polished to have an optical finish and to conform to the detail illustrated in FIG. 2.

Figure 3:
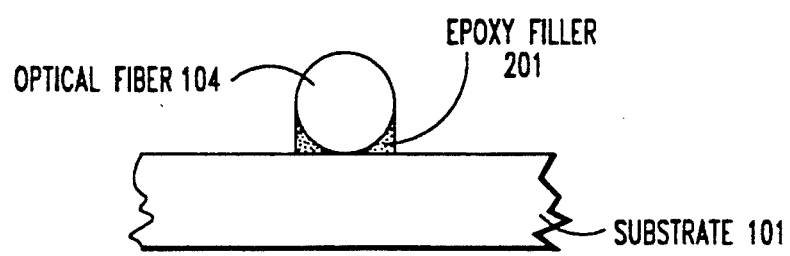

Outside of region 108, epoxy filler 201 is also placed between substrate 101 and optical fibers 104 or 105 as illustrated in FIG. 3 which shows cross-section 109 of FIG. 1. Epoxy filler 201 between optical fiber 104 and substrate 101 is polished to have an optical finish and also so that the detail of epoxy filler 201 conforms to that illustrated in FIG. 3.

Within region 106 and similar regions of FIG. 1, the coating is not removed from the optical fibers. This allows for the insertion of an optical fiber still having its outside coating into the resulting splitter/combiner which provides pigtailing of attached optical fibers. This pigtailing is explained in greater detail with respect to FIGS. 4 and 5 which give the details of attaching optical fibers to the splitter/combiner which is formed using the mold illustrated in FIG. 1.

Figure 4:
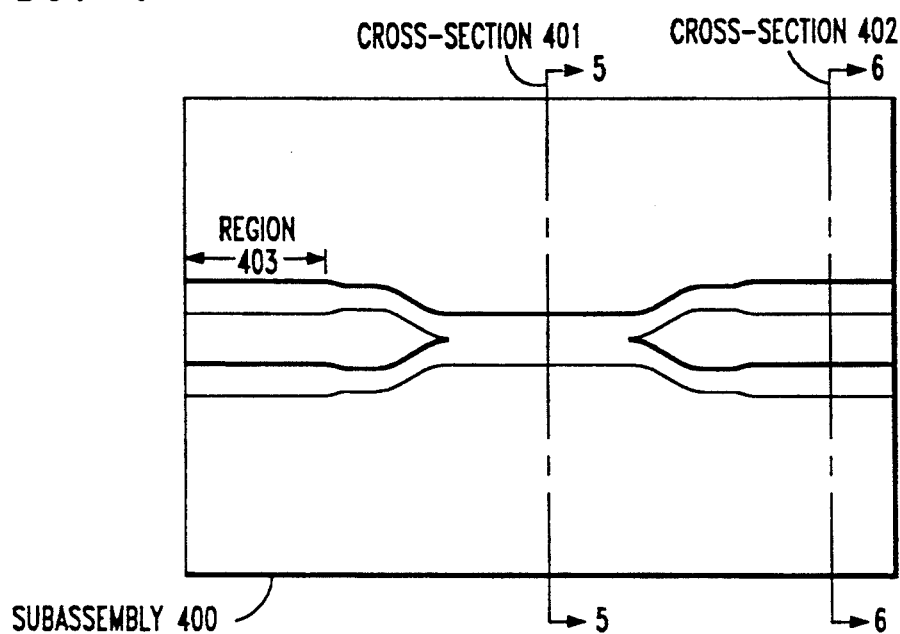
FIG. 4 illustrated a subassembly of an optical component.

After the fibers and the epoxy have been placed on the mold illustrated in FIG. 1, sides are attached to FIG. 1 using well known techniques. A two input and two output splitter/combiner can be formed by injecting a curable material in semi-liquid state into the mold of FIG. 1, following well accepted molding practices. The semi-liquid is then cured using well accepted curing practices. Advantageously, an UV curable material can be used such as KAYARAD PFC-501 manufactured by Nippon Kayaku Co. Ltd. In addition, a temperature curable material can be used such as CONAP DPTU-10403 which is manufactured by Conap Inc. FIG. 4 illustrates subassembly 400 which is cast in the manner just described from the mold illustrated in FIG. 1. Subassembly 400 in conjunction with subassembly 701 form splitter/combiner 700 as illustrated in FIG. 7. Subassembly 701 is a lid which is placed over subassembly 400, and the surface of subassembly 701 that interfaces with subassembly 400 and has an optical finish.

Figure 5:
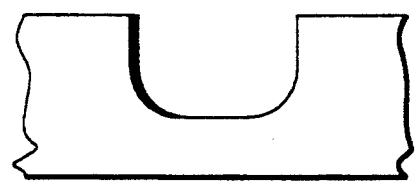
FIGS. 5 and 6 illustrate cross-sectional views of the subassembly of FIG. 4.
Figure 6:
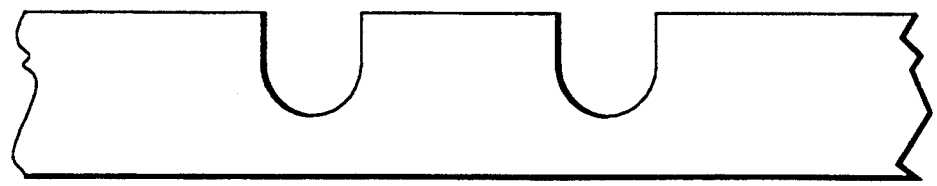

FIG. 5 illustrates cross section 401 of FIG. 4 which is a cross section of the splitting/combination region of subassembly 400. Similarly, FIG. 6 illustrates cross section 402 of FIG. 4. Region 403 of FIG. 4 (whose cross section is identical to cross section 402) is large enough to accommodate the optical fiber with its coating.

As previously mentioned, FIG. 7 illustrates the completed assembly of splitter/combiner 700 which is a two input two output splitter/combiner. Optical fibers are inserted into channels such as channels 702 and 703 with two more channels, which are not shown, on the opposite end from channels 702 and 703. Consider now how optical fibers are attached to the splitter/combiner of FIG. 7. First, a transparent optical medium, a semi-liquid material that later hardens to a solid, is injected into channel 702 or 703. The optical medium has a refractive index selected to be higher than the refractive index of subassemblies 400 and 701 so as to form an optical waveguide with a numerical aperture which substantially matches the numerical apertures of optical fibers 801 through 804 that will be attached to splitter/combiner 700 as illustrated in FIG. 8. After injection of the optical medium, optical fibers 801 through 804 are inserted into the appropriate channels of splitter/combiner 700. The coating has not been removed from these optical fibers. Hence, the optical fibers are inserted into the splitter/combiner 700 only within the portion of subassembly 400 which is large enough to accommodate the fiber with its outside coating, e.g., regions such as region 402 of FIG. 4.

Details on the preparation and insertion of the optical medium are given in U.S. Pat. No. 4,913,508, which is hereby incorporated by reference.

Advantageously, the optical medium may be CONAP DPTU-10403 if KAYARAD PFC-501 was utilized to produce subassemblies 400 and 701. Advantageously, the optical medium may be EPO-TEK 301-2 which is manufactured by Epoxy Technology, Inc. if CONAP DPTU-10403 was utilized to produce subassemblies 400 and 701. Since the optical medium also serves the purpose of an adhesive, optical fibers 801 through 804 are attached to splitter/combiner 700 by the outer coating of these fibers; hence, are pigtailed to splitter/combiner 700.

An alternate method for making a mold for fabricating subassembly 400 is to first cast a negative mold from the mold illustrated in FIGS. 1, 2, and 3. The resulting negative mold is identical to subassembly 400 illustrated in FIGS. 4, 5, and 6. From this negative mold, a positive mold is then cast which is identical to the model shown in FIGS. 1, 2, and 3. The material used in the resulting positive mold is selected to have greater physical strength then the combination of optical fibers and a silicon or glass substrate.

A second embodiment of the invention is now described. In this embodiment, two molded subassemblies are produced with each subassembly having half of each of the channels as opposed to the embodiment illustrated in FIGS. 7 and 8 where subassembly 400 provided the whole channels. FIG. 9 illustrates splitter/combiner 900 which utilizes subassemblies 901 and 902 produced by this second embodiment. FIGS. 10 and 11 show cross-section viewed of the splitter/combiner 900 illustrating the fact that subassemblies 901 and 902 each form half of the channels. Consider how a mold is fabricated to cast subassemblies 901 and 902.

Figure 12:
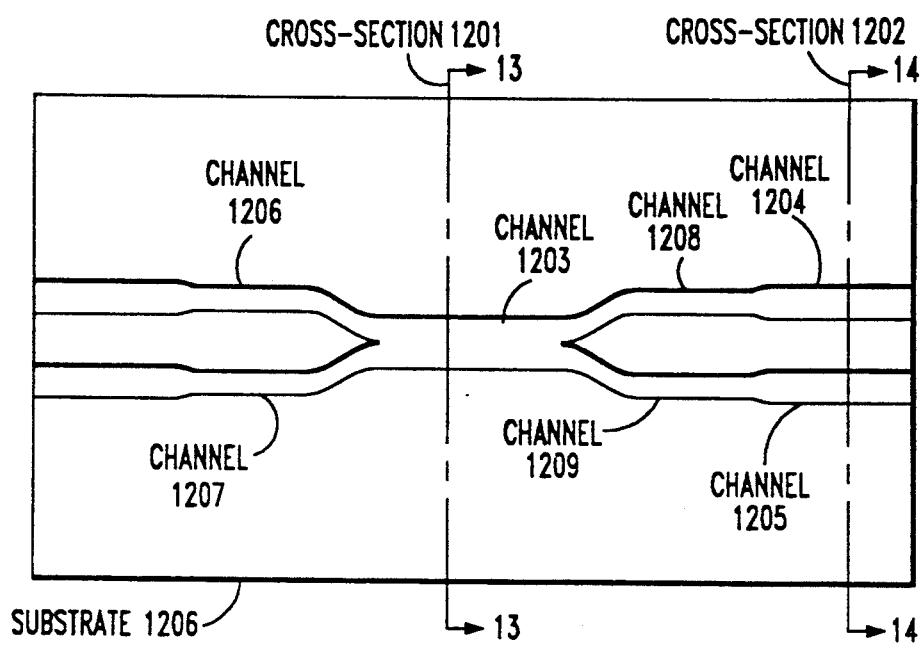
FIG. 12 illustrates the channels which are etched into a substrate prior to the attachment of optical fibers for the splitter/combiner of FIG. 9.
Figure 13:
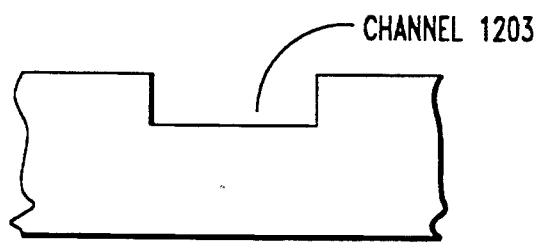
FIGS. 13 and 14 illustrate cross-sectional views of the substrate of FIG. 12.
Figure 14:
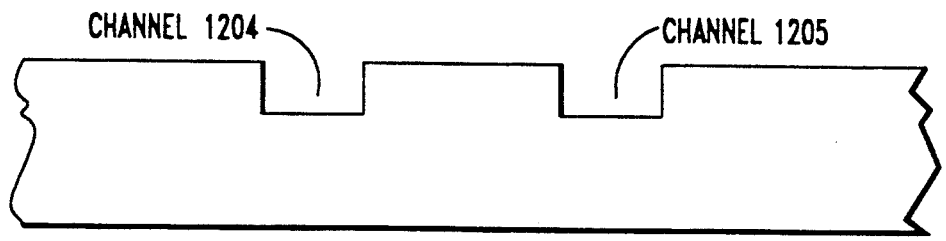
Figure 15:
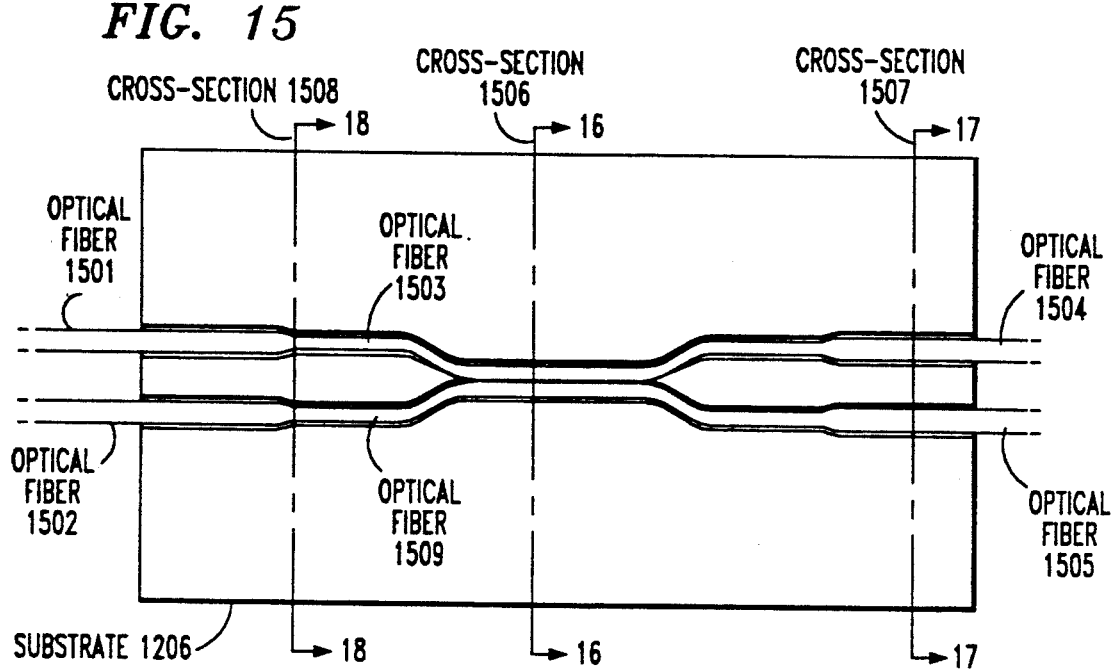
FIG. 15 illustrates the mold utilized to fabricate the splitter/combiner of FIG. 9.
Figure 16:
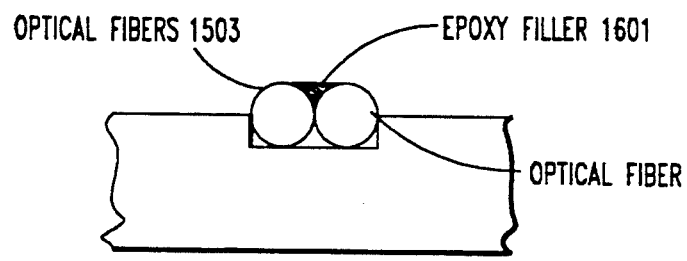
FIGS. 16, 17 and 18 illustrate cross-sectional views of the subassembly of FIG. 15.
Figure 17:
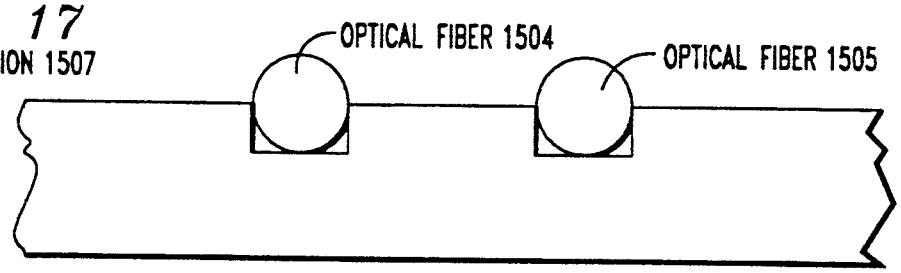

In order to make a mold for the second embodiment, first a silicon or glass substrate is etched to form channels into which optical fibers will be seated; and then, the optical fibers are placed in these channels. FIGS. 12, 13, and 14 illustrate how substrate 1206 is etched. Channels 1203, 1206, 1207, 1208, and 1209 of FIG. 12 have been etched to accommodate smaller optical fibers than channels 1204 and 1205 which have been etched to accommodate larger optical fibers including the coating. This is done to allow pigtailing of optical fibers attached to the final splitter combiner. The diameter of the smaller optical fiber is approximately equal to diameter of the optical core of the larger optical fibers. Channel 1203 is the splitting/combining portion of splitter/combiner 900 illustrated in FIG. 9. After substrate 1206 has been etched, the optical fibers as illustrated in FIGS. 15, 16, and 17, are seated into the etched channels. The first of these fibers to be seated are fibers 1503 and 1509. These fibers are seated so that they extend out on either side of substrate 1206. Then, optical fibers 1503 and 1509 are scribed and cut to fit within channels 1203, 1206, 1207, 1208 and 1209, and the cut ends of optical fibers 1503 and 1509 are removed .Optical fibers 1501, 1502, 1504 and 1505 are than inserted into the proper channels utilizing an adhesive to attach these fibers. The latter fibers include their coating.

Figure 18:
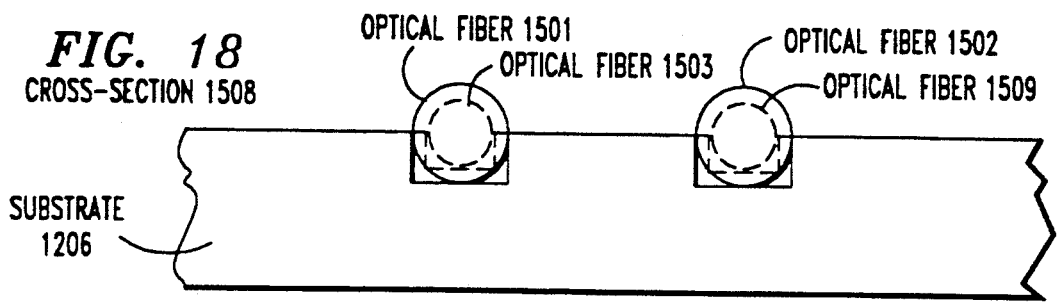

Cross-section 1508 as illustrated in FIG. 18 and shows the interface between optical fibers 1501 and 1502 and optical fibers 1503 and 1509, respectively. As can be seen from FIG. 18, the optical channels into which the optical fibers are seated properly align the optical fibers to so that, for example, optical fiber 1503 is centered with the core of optical fiber 1501. This alignment allows for optimal communication of light between channels formed by optical fiber 1501 and 1503. After these fibers have been positioned, the mold is produced as was previously described for the first embodiment. From this mold splitter/combiner 900 is produced by first casting subassemblies 901 and 902. Then subassemblies 901 and 902 are joined together to form splitter/combiner 900. Optical fibers can then be attached to splitter/combiner 900 as was previously described for splitter/combiner 700 of the first embodiment.

An alternate method for making a mold for fabricating splitter/combiner 900 is to first cast a negative mold from the mold illustrated in FIGS. 15 through 18. The resulting negative mold is identical to subassemblies 901 or 902 illustrated in FIGS. 9, 10, and 11. From this negative mold, a positive mold is then cast which is identical to the mold shown in FIGS. 15 through 18. The material used in the resulting positive mold is selected to have greater physical strength then the combination of optical fibers and a silicon or glass substrate.

It is to be understood that the above-described embodiments are merely illustrative of the principles of the invention and other arrangements may be devised by those skilled in the art without departing from the spirit and the scope of the invention. In particular, molds can be made for splitter/combiner units which would have more inputs and outputs than those illustrated in the above-described embodiments

We claim:

1. An optical component for interconnecting a plurality of optical fibers, manufactured by the process of:
   attaching a plurality of optical fibers to an optically finished substrate so that said plurality of said optical fibers are in contact with each other within a predefined area of said substrate so that an optical mixing region will be formed within said optical component;
   forming a mold by enclosing said substrate with walls;
   casting a part of said optical component by injecting a cladding material into said mold;
   removing said part of said optical component from said mold; and
   securing a lid onto said part of said optical component to form said optical component and said lid is fabricated from said cladding material and has an optically finished surface.

2. The optical component of claim 1 wherein each of said other plurality of said optical fibers having an outer coating, cladding and core and the step of attached comprises the step of removing said outside coating from each of said other plurality of said optical fibers along the circumference of each of said other plurality of said optical fibers that are in contact with other ones of said other plurality of said optical fibers within said predefined area.

3. The optical component of claim 2 wherein the step of attaching further comprises the steps of:
   placing a filler material between said other plurality of said optical fibers within said predefined area such that the top surface of said filler material within said predefined area is level with tops of said other plurality of said optical fibers; and
   placing said filler material between each of said other plurality of said optical fibers outside of said predefined area and said substrate such that outer surfaces of said filler material are tangent to the sides of each of said other plurality of said optical fibers and perpendicular to said substrate.

4. The optical component of claim 1 wherein each optical fiber of said plurality of said optical fibers has a outer coating, cladding and core that have the same dimensions as said outer coating, cladding and core of each optical fiber of said other plurality of said optical fibers.

5. An optical component for interconnecting a first plurality of optical fibers, manufactured by the process of:
   etching into a substrate three sets of grooves such that each of said first set of grooves has a depth equal to a radius and width equal to a diameter of one of a second plurality of optical fibers, each of said second set of grooves has a depth equal to a radius and width equal to a diameter of one of a third plurality of optical fibers, said third set of grooves has only one groove which as a depth equal to a radius of one of a third plurality of optical fibers and a width equal to a diameter of one of a third plurality of optical fibers multipled by the number of input ones of said first plurality of optical fibers that will be interconnected to said optical component and said grooves arranged such that said second set of grooves are abutted to said first and third sets of grooves;
   attaching said second plurality of optical fibers into said first set of grooves and said third plurality of optical fibers into said second and third sets of grooves such that said second plurality of optical fibers are abutted to said third plurality of optical fibers;
   forming a mold by enclosing said substrate with walls;
   casting a first half of said optical component by injecting a cladding material into said mold;
   removing said first half of said optical component from said mold;
   casting a second half of said optical component by injecting said cladding material into said mold;
   removing said second half of said optical component from said mold; and
   securing said first and said second halves together to form said optical component.

6. The optical component of claim 5 wherein each optical fiber of said first plurality of said optical fibers has an outer coating, cladding and core and each optical fiber of said second plurality of said optical fibers have an outer coating, cladding and core that have the same dimensions as those of said first plurality of said optical fibers.

7. The optical component of claim 6 wherein each optical fiber of said third plurality of said optical fibers has a cladding and core that have the same outer dimensions as said core of each optical fiber of said second plurality of said optical fibers.

8. The optical component of claim 7 wherein said step of etching comprises the step of aligning one of said first set of grooves with one of said second set of grooves at a point of abutment such that said one of said second set of grooves is centered with respect to said one of said first set of grooves.

9. An optical component for interconnecting a plurality of optical fibers, manufactured by the process of:
   forming a mold by attaching another plurality of optical fibers to an optically finished substrate so that said other plurality of said optical fibers are in contact with each other within a predefined area of said substrate so that an optical mixing region will be formed within said predefined area in said optical component;

casting a part of said optical component by injecting a cladding material into said mold;

removing said part of said optical component from said mold; and securing a lid onto said part of said optical component to form said optical component and said lid is fabricated from said cladding material and has an optically finished surface.

10. An optical component for interconnecting a first plurality of optical fibers, manufactured by the process of;

forming a mold by etching into a substrate three sets of grooves such that each of said first set of grooves has a depth equal to a radius and width equal to a diameter of one of a second plurality of optical fibers, each of said second set of grooves has a depth equal to a radius and width equal to a diameter of one of a third plurality of optical fibers, said third set of grooves has only one groove which has a depth equal to a radius of one of a third plurality of optical fibers and a width equal to a diameter of one of a third plurality of optical fibers multiplied by the number of input ones of said first plurality of optical fibers that will be interconnected to said optical component and said grooves arranged such that said second set of grooves are abutted to said first and third sets of grooves, and by attaching said second plurality of optical fibers into said first set of grooves and said third plurality of optical fibers into said second and third sets of grooves such that said second plurality of optical fibers are abutted to said plurality of optical fibers;

casting a first half of said optical component by injecting a cladding material into said mold;

removing said first half of said optical component form said mold;

casting a second half of said optical component by injecting said cladding material into said mold;

removing said second half of said optical component from said mold; and securing said first and said second halves together to form said optical component.

* * * * *